No. 678,157. Patented July 9, 1901.
B. BJARNASON.
DYNAMO ELECTRIC MACHINE.
(Application filed Dec. 8, 1900.)
(No Model.) 3 Sheets—Sheet 1.
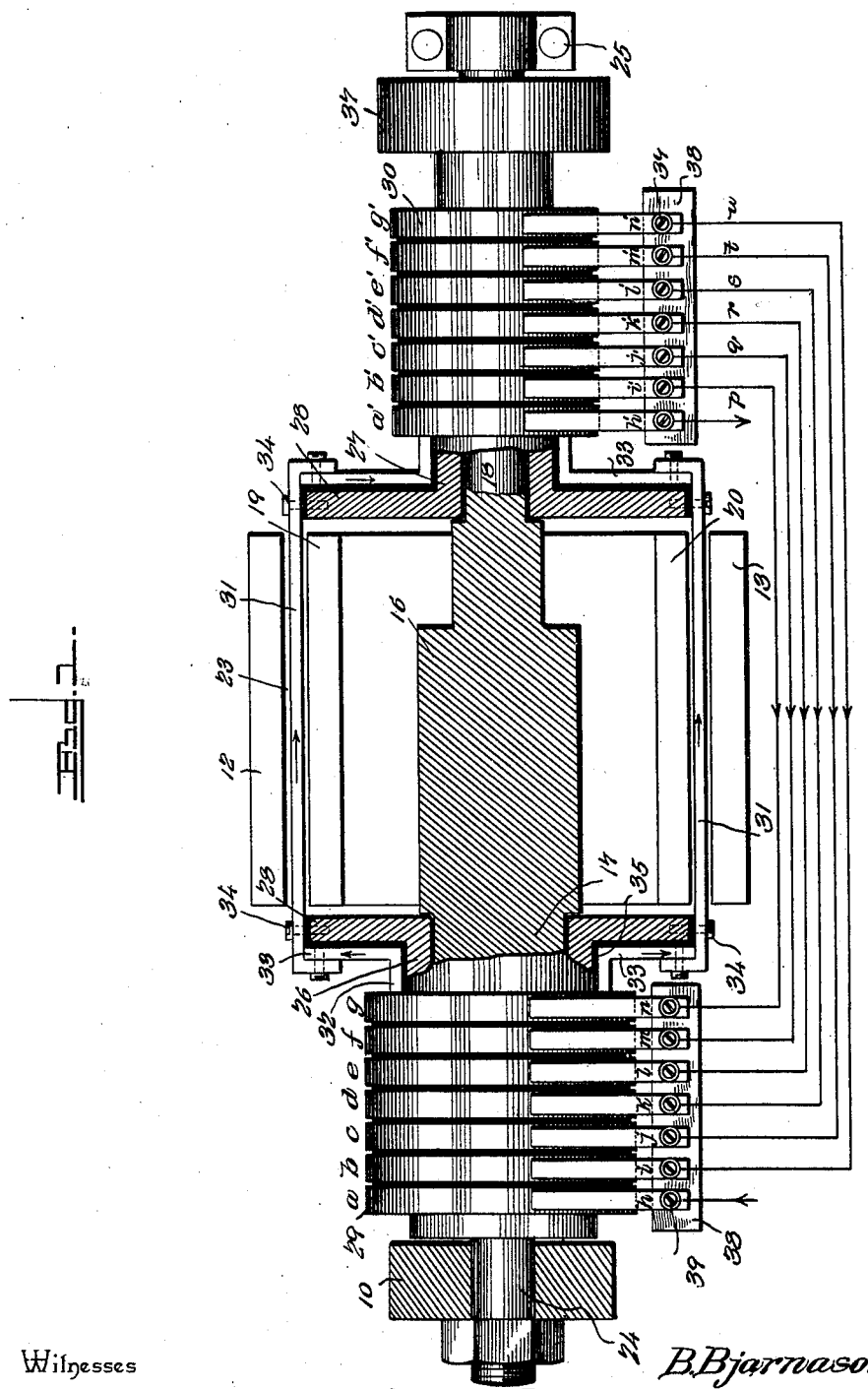
Witnesses
E. F. Stewart
H. J. Bernhof
B. Bjarnason Inventor
By C. A. Snow & Co. Attorneys, No. 678,157. Patented July 9, 1901.
B. BJARNASON.
DYNAMO ELECTRIC MACHINE.
(Application filed Dec. 8, 1900.)
(No Model.) 3 Sheets—Sheet 2.
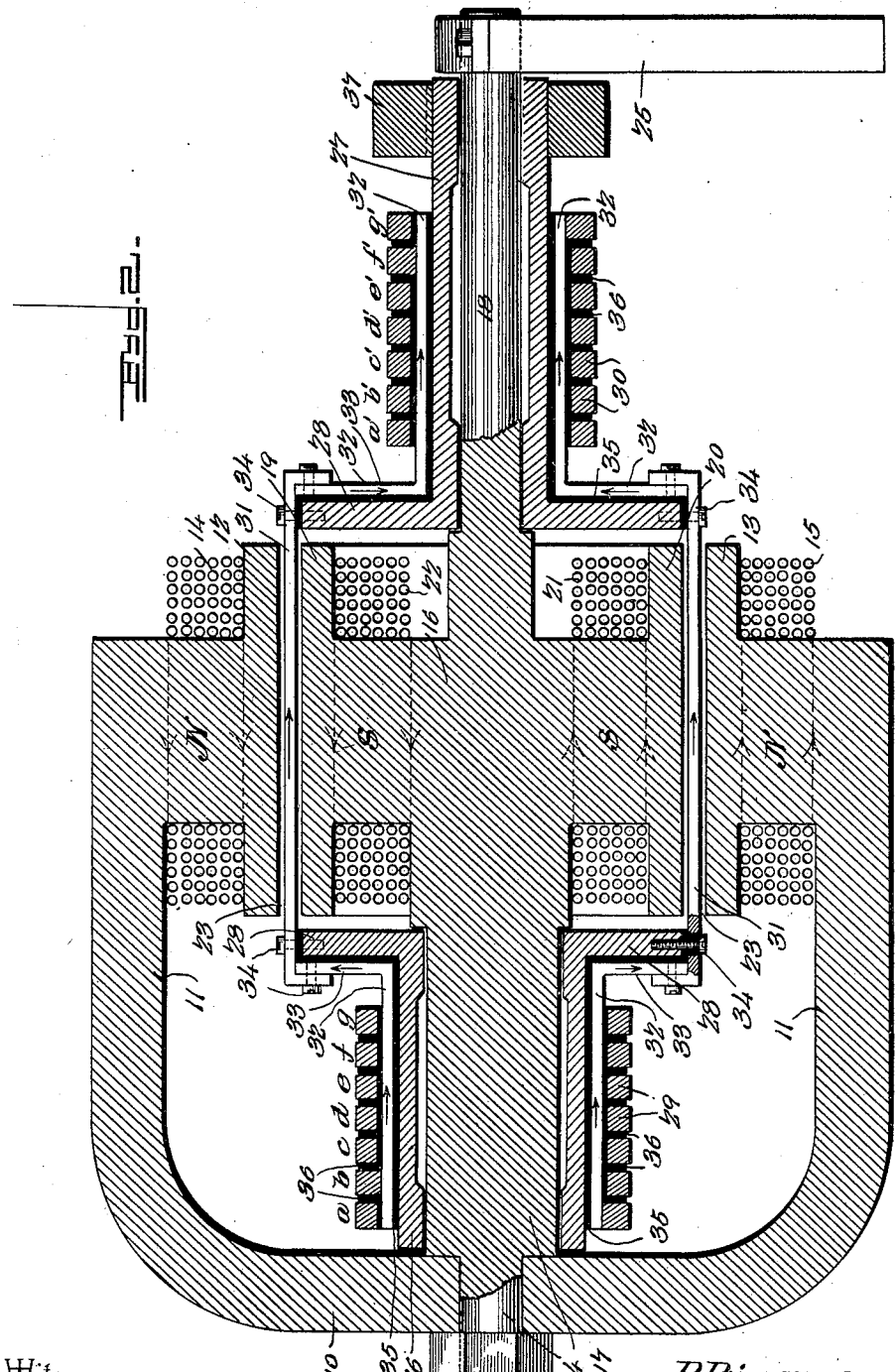

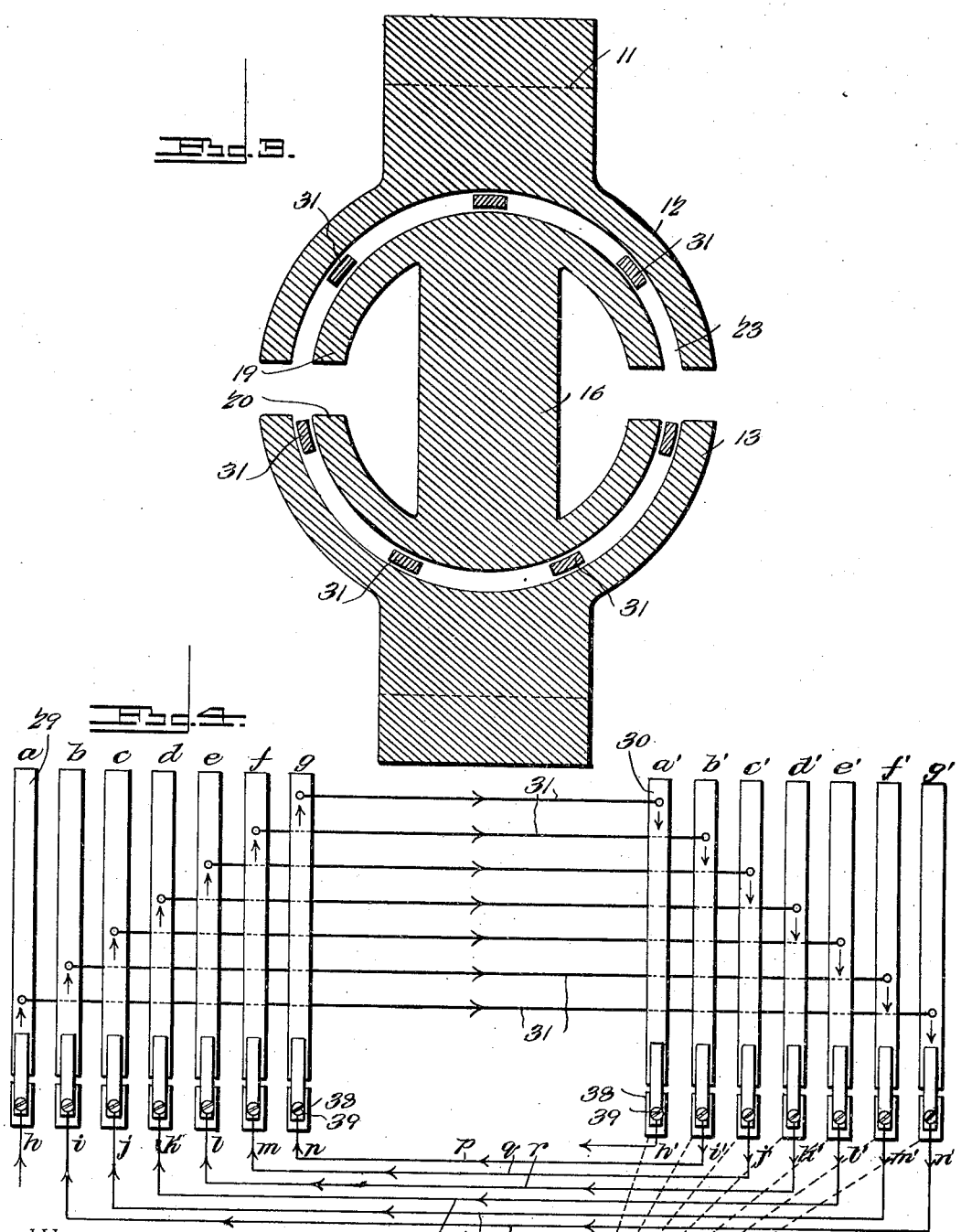

UNITED STATES PATENT OFFICE.

BJARNI BJARNASON, OF SEATTLE, WASHINGTON.

DYNAMO-ELECTRIC MACHINE.

SPECIFICATION forming part of Letters Patent No. 678,157, dated July 9, 1901.

Application filed December 8, 1900. Serial No. 39,207. (No model.)

*To all whom it may concern:*

Be it known that I, BJARNI BJARNASON, formerly a subject of the King of Denmark, but having made oath of my intention to become a citizen of the United States, residing at Seattle, in the county of King and State of Washington, have invented a new and useful Dynamo-Electric Machine, of which the following is a specification.

My invention relates to a low-tension direct-current dynamo; and the object in view is the production of a simple machine adapted for the generation of a low-pressure current useful for incandescent lighting, in the art of electrolysis, and for other purposes, such dynamo obviating the employment of an ordinary commutator, which has been found to be quite troublesome in low-voltage electric generators.

The invention consists of a dynamo having a double magnetic circuit formed by a double elemental shunt-wound core, one member of said core being situated within the other, each core element or member having poles of like polarity opposed to poles of the opposite polarity on the other element, combined with a revoluble element having copper bars rotatable in the magnetic field of the pole-pieces on the cores, said copper bars connected in series and associated with collars and rings, upon which ride the collector-brushes.

The invention further consists in the novel combination and construction of parts, which will be hereinafter fully described and claimed.

To enable others to understand the invention, I have illustrated a preferred embodiment thereof in the accompanying drawings, forming a part of this specification, and in which—

Figure 1 is a plan view, partly in section, of my improved direct-current dynamo, illustrating the arrangement of the collars and collector-brushes and the conductors by which the collars and their collector-bars are connected in series. Fig. 2 is a vertical section taken longitudinally through the machine. Fig. 3 is another vertical section taken transversely through the machine in the plane of the pole-pieces of the magnet-cores. Fig. 4 is a diagram including a switch mechanism to show the course of the current by the arrows.

Like characters of reference are used to indicate corresponding parts in each of the several figures of the drawings.

The magnetic field of my improved dynamo consists of an outer element and an inner element, both of which are stationary and arranged in such relation that the inner element lies within the external element. This external element 10 of the field is in the form of a yoke, having its arms 11 terminating in the pole-pieces 12 13. The field-coils 14 15 for this external element of the field are wound or coiled reversely on the arms of the yoke to produce poles of like polarity, which are essentially north poles, as represented by Fig. 2.

The internal element of the magnetic field is a mass of iron 16, which is reduced at the ends to form the cylindrical portions 17 18, and this internal field element is also constructed with the pole-pieces 19 20, which are arranged in opposing relation to the pole-pieces of the external field element. As shown by Fig. 3 of the drawings, the opposing pole-pieces on the external and internal elements of the field are curved in cross-section and are separated at their contiguous ends, so as to produce relatively large surfaces opposed to each other. The field-coils for the internal element of the magnet are shunt-wound in reverse directions, as at 21 22, on reduced portions of the field element 16, adjacent to the pole-pieces thereof, and thus the poles of the internal field element are of like polarity, the same being essentially south poles, as shown by Fig. 2. It is to be observed that the external field element 10 is wound to produce at its terminal pole ends the poles of like polarity and that the internal field element is shunt-wound to produce in its terminal pieces poles of corresponding polarity. The two elements of the field are assembled for their pole-pieces to oppose each other in a manner to form an intermediate space 23 between the opposing faces of the pole-pieces, in which space is adapted to rotate the copper bars on the rotary element of the dynamo. The internal field element 16 is supported firmly in place within the external field element, and as one means for thus supporting the internal field element I have shown one end of the element 16 as having a stem 24, which is fastened firmly to the middle of the yoke-shaped external field element, while the other end of said element 16 is secured in a standard or post 25, which may be insulated either from the field element 16 or from the base of the machine.
The revoluble element of my dynamo consists of short tubular shafts 26 27, each having an end disk 28, two series of collars or rings 29 30, and a plurality of sectional copper bars 31, all of said parts being connected firmly together for the copper bars 31 to traverse the magnetic field of the stationary magnet, which is formed by the two elements 10 16 of the core. The short tubular shafts 26 27 are sleeved loosely on the cylindrical end portions 17 18 of the internal field element, so that the shafts may rotate with great freedom thereon. As hereinbefore indicated, the copper bars of the revoluble dynamo element are made in sections, the length 31 of each bar being disposed in the space 23 between the opposing poles of the external and internal field elements, while the lengths 32 of said copper bars are arranged longitudinally along the tubular shafts 26 27, each length 32 having an outturned end 33 applied against the outer face of an end disk 28 on the tubular shaft. The length 31 of each copper bar is joined firmly to the lengths 32 thereof and to the end disks of the tubular shaft by the insulated bolts or screws 34, and these lengths 32 of said bars are insulated thoroughly from electrical contact with the tubular shafts by the insulation 35. The rings or collars 29 circumscribe the lengths 32 of the copper bars on the tubular shaft 26, while the other series of collars 30 in like manner circumscribe the lengths 32 of the copper bars on the other tubular shaft 27. The collars in each series are insulated from electrical contact by the insulation 36, and each series of collars, together with the lengths 32 of the copper bars, is united or bound firmly to and insulated from electrical contact with the proper tubular shaft, while the lengths 31 of the copper bars serve to operatively connect the two tubular shafts through the medium of the end disks 28 thereof. If desired, I may connect the tubular shafts by auxiliary devices of diamagnetic material in order to relieve the strain on the lengths 31 of the copper bars, particularly in the construction of machines of large capacity. The revoluble element of the dynamo is driven by a pulley 37, which is shown as fast with the outer end of the tubular shaft 27.

The current is taken from and led to the machine through the medium of conductors associated with the end collars of the two series of rings or collars 29 30, and the copper bars are connected individually with corresponding collars of the two sets; but the collars themselves are connected electrically in alternate order or relation, as will presently appear. In order to make clear this connection of the two sets of collars, the copper bars, and the conductors, as well as the brushes, I have indicated the parts as follows: The collars of the set 29 are designated individually by the letters $a\ b\ c\ d\ e\ f\ g$, the collars of the set 30 by the letters $a'\ b'\ c'\ d'\ e'\ f'\ g'$, the brushes which engage with and bear on the collars of the set 29 by the letters $h,\ i,\ j,\ k,\ l,\ m$, and $n$, and the brushes which bear on the collars of the set 30 by the letters $h',\ i',\ j',\ k',\ l',\ m'$, and $n'$.
The brushes for each set of collars are supported on the posts or blocks 38 by means of the screws 39, said posts being insulated from the machine-base, or the brushes may themselves be insulated from the post. A copper bar is connected electrically with the collars $a$ and $g'$ of the two sets 29 30, while this particular copper bar is insulated from electrical engagement with all the other collars or rings of the two sets. Another copper bar is connected electrically with the collars $b$ and $f'$ of the two sets and in like manner is insulated from all the other collars, and so on throughout the series of collars, it being necessary to employ as many collars in each set as there are copper bars in the machine, and in this instance seven in number. The leads to the circuit are furnished by the collars $a\ a'$ and the brushes $h\ h'$ associated therewith, (see Figs. 1 and 4;) but the remaining collars and brushes of the two sets are connected alternately in series through the medium of the conductors $p,\ q,\ r,\ s,\ t$, and $u$, arranged and connected in the following order: The brush $i$ for the collar $b$ of the set 29 is connected with the brush $n'$ of the collar $g'$ on the set 30, the brush $j$ for the collar $c$ of the set 29 is connected by the conductor $t$ with the brush $m'$ of the collar $f'$ on the set 30, and so on throughout the two series of collars, brushes, and the conductors, as shown by Figs. 1 and 4. This arrangement and connection of the collars, the copper bars, the brushes, and the conductors effects the connection of the copper bars electrically in series, so that the current generated in the bar which connects the collars $b\ f'$ will flow through the remaining bars of the series, except through the copper bar of the primary collars $a\ g'$, and the described construction dispenses with the employment of an ordinary commutator, which has been found to be quite troublesome in machines of low voltage from causes which will be readily apparent.

In Fig. 4 of the drawings I have shown a switch mechanism or rheostat which may be employed to cut one or a series of copper bars out of the circuit. The switch 40, having the line-wire 40' connected therewith, is adapted to make either of the contacts 41, which are in circuit by the conductors 42 with the collector-brushes of the machine, and this switch may be shifted to different positions to vary the voltage of the current.

Changes may be made in the form and proportion of some of the parts, while their essential features are retained and the spirit of the invention embodied. Hence I do not desire to be limited to the precise form of all the parts as shown, reserving the right to vary therefrom.

Having thus described the invention, what I claim is—

A low-tension direct-current dynamo comprising a field-magnet including an outer member having spaced arms and a connecting-web, the ends of the arms being directed toward each other and having windings, an inner member including cylindrical end portions and central radiating poles provided with windings and axially alined with the inturned ends of the outer member, the inner member being mounted at one end in the web of the outer member, sleeves mounted rotatably upon the cylindrical end portions of the inner member and having radial flanges at their inner ends, conductor-bars disposed upon the peripheries of the flanges and having attaching-screws passed therethrough and into the flanges, said bars being disposed between the inturned ends of the outer member and the poles of the inner member, and collector-rings upon the sleeves and with which the bars are connected, respectively.

In testimony whereof I affix my signature in presence of two witnesses.

BJARNI BJARNASON.

Witnesses:
Z. B. RAWSON,
C. E. BECKER.